United States Patent
Yang et al.

(10) Patent No.: US 6,596,152 B2
(45) Date of Patent: Jul. 22, 2003

(54) METHOD AND DEVICE FOR SIMULTANEOUS ARC PROCESSING AND CHEMICAL ETCHING

(75) Inventors: Ching-Tang Yang, TaiNan (TW); Hung-Yin Tsai, Hsinchu (TW); Tung-Chuan Wu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/779,653

(22) Filed: Feb. 9, 2001

(65) Prior Publication Data
US 2002/0108864 A1 Aug. 15, 2002

(51) Int. Cl.⁷ .............. B23H 3/00; B23H 5/00; C25D 17/00
(52) U.S. Cl. ............ 205/640; 219/69.17; 204/224 M
(58) Field of Search .............. 204/224 M; 205/640, 205/668, 652; 219/69.1, 69.17, 69.11

(56) References Cited

U.S. PATENT DOCUMENTS

| | | | |
|---|---|---|---|
| 2,258,480 A | * | 10/1941 | Bergmann et al. .......... 204/164 |
| 2,300,855 A | * | 11/1942 | Allen et al. .............. 125/30.02 |
| 4,800,006 A | * | 1/1989 | Kuwabara et al. ..... 204/224 M |
| 4,847,463 A | * | 7/1989 | Levy et al. ............ 219/121.19 |
| 4,861,450 A | * | 8/1989 | Asaoka et al. ........ 204/224 M |
| 5,217,586 A | * | 6/1993 | Datta et al. ............ 204/224 M |
| 5,993,637 A | * | 11/1999 | Hisamatsu et al. .... 204/224 M |

* cited by examiner

Primary Examiner—Nam Nguyen
Assistant Examiner—Thomas H. Parsons
(74) Attorney, Agent, or Firm—Troxell Law Office PLLC (57) ABSTRACT

The present invention relates to an arc processing method and device with simultaneous chemical etching wherein the device comprises a conductive electrode, being the cathode, an auxiliary electrode, being the anode, an conductive fluid, and an non-conductive work piece for processing. Processing, and precision processing in particular, of non-conductive materials is obtained by simultaneous arc discharge and etching that are brought about by chemical reactions associated with cathode and anode. Moreover, the present invention discloses simultaneous arc processing and chemical etching that offers improved processing efficiency over conventional arc processing.

7 Claims, 7 Drawing Sheets

FIG. 6 fine drill processing of gemstones (φ200μm)      drill of glasses (φ250μm)

(agate, Burmese jade, ruby, and artificial diamonds)    (laser machining)    (simultaneous arc and etching)

Fig. 8      Fig. 7

METHOD AND DEVICE FOR SIMULTANEOUS ARC PROCESSING AND CHEMICAL ETCHING

FIELD OF THE INVENTION

The present invention relates to an arc processing method and device with selective chemical etching and in particular relates to an arc processing method and device capable of processing non-conductive or poor-conductivity materials.

BACKGROUND OF THE INVENTION

Conventional arc processing is achieved by using a control circuit for a discharge process in which a current source is connected across the electrode and the work piece for generating an arc discharge, said circuit producing pulses for the ignition and stabilization of the arc. Being limited to heating, melting or fusion, prior methods normally do not involve chemical etching. It normally involves slower processes, with such disadvantages that the processes usually leave behind a rough surface on the work piece. Moreover, the work piece has to be electrically conductive in order to be arc processed as described above. Consequently, such conventional arc processing as or carving processing cannot be extended to non-conductive or poor-conductive materials.

In light of the foregoing, the present invention is aimed to provide solutions to the aforementioned discrepancies so as to attain enhanced processing with extended applications.

SUMMARY OF THE INVENTION

An object of the present invention is to provide a method and device for processing non-conductive materials. Bubbles are first created by electrolysis to form insulating bubble layers. By continuous application of high voltage across the electrodes to cause ionic breakdown in the bubble layers, the present invention is capable of generating arc discharge, thereby enabling fusion evaporation and chemical etching for processing non-conductive materials.

Another object of the present invention is to improve arc-processing efficiency. Simultaneous action of arc processing and chemical etching elevates processing rates while achieving surface smoothness on the work piece.

The third object of the present invention is to reduce the operation cost by applying low cost arc processing on high precision and non-conductive parts. The demand for low cost processing remains high and the present invention provides solutions in terms of method and device.

The following Description and Designation of Drawings are provided in order to help understand the features and content of the present invention.

BRIEF DESCRIPTION OF THE DRAWINGS

The accompanying drawings form a material part of this description, in which.

DETAILED DESCRIPTION OF THE PREFERRED EMBODIMENT

Figure 1:
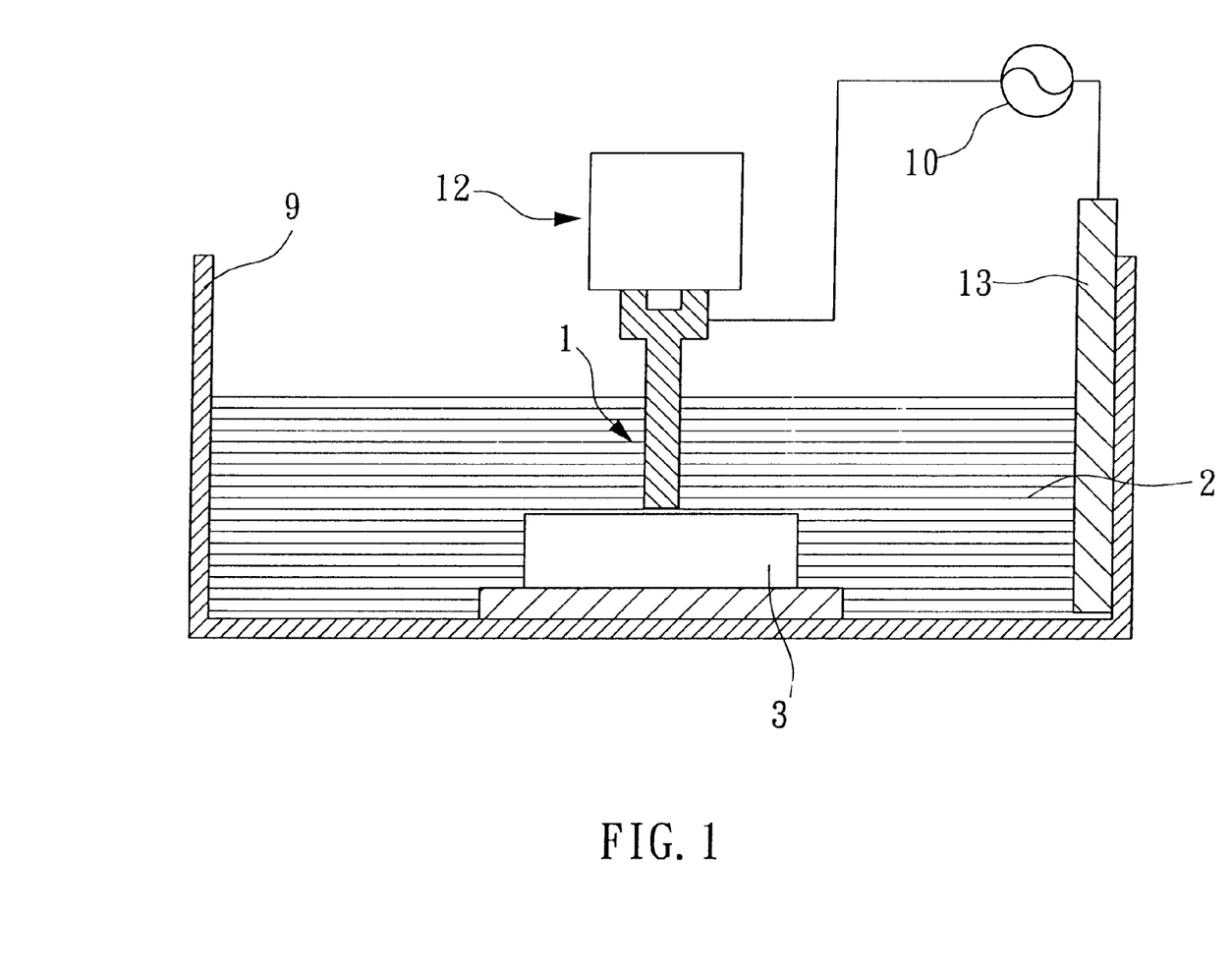
FIG. 1 is a perspective view of the device for simultaneous arc processing and chemical etching in accordance with the first embodiment of the present invention.

As shown in FIG. 1, a schematic diagram of the device for simultaneous arc processing and chemical etching illustrates the first embodiment of the present invention. The apparatus in accordance with the first embodiment has a conductive electrode 1, acting as the cathode and an auxiliary conductive electrode 13, being the anode. Fastened by a holder 12, said conductive electrode 1 is connected in series with said auxiliary electrode 13 and an external power supply 10. The apparatus further comprises an conductive fluid 2, being restrained in a conductive fluid container 9, wherein said conductive electrode 1 hangs over the top, drops down and dips in said conductive fluid 2 while said auxiliary electrode 13 also immerses in said conducting fluid 2. Immersed entirely in conductive fluid 2, situated on and facing the coming arc path at a proper distance from the electrode 1, a non-conductive work piece 3 for processing is in a condition of nearly zero conductivity. Composed of heat-resistant and anti-corrosive materials, said conductive fluid container 9 is used in high temperature and chemically reactive environments.

Figure 2A:
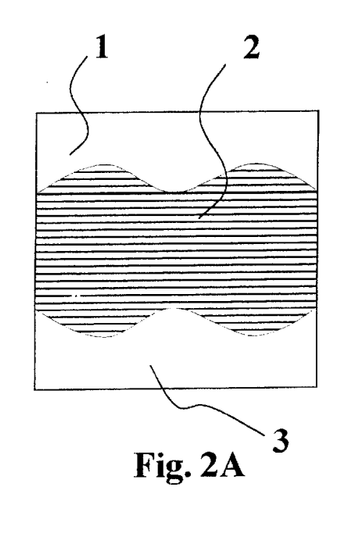
FIG. 2A is a perspective view showing the condition prior to generation of air bubbles.
Figure 2B:
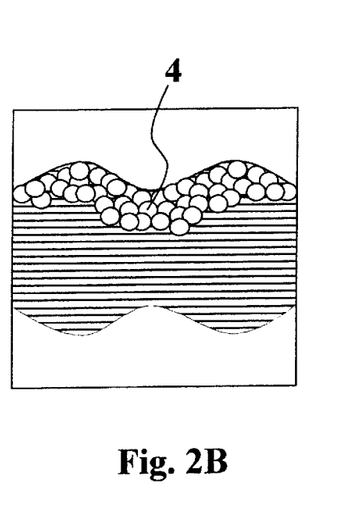
FIG. 2B is a perspective view demonstrating the generation of air bubbles.
Figure 2C:
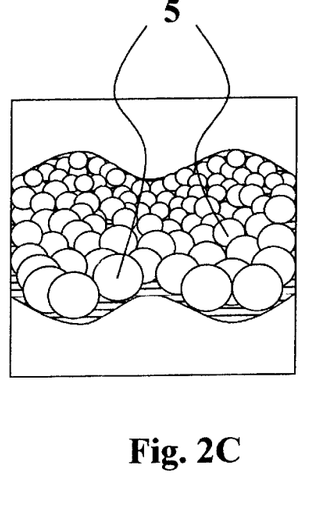
FIG. 2C is a perspective view illustrating the formation of air bubble layers.
Figure 2D:
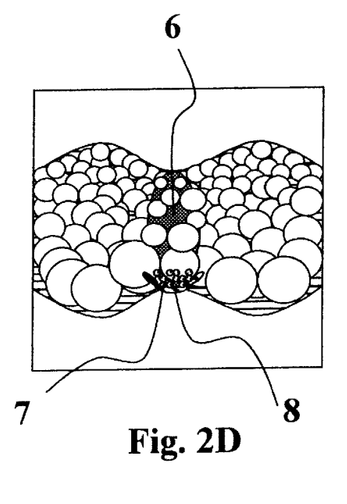
FIG. 2D is a perspective view showing the formation of arc.

Specific steps of the present invention are stipulated in the following paragraphs. Placed in a conductive fluid 2 and a proper distance away from a non-conductive work piece 3, a conductive electrode 1 points its arc path toward said non-conductive work piece 3. An external power supply 10 is connected to conductive electrode 1 and auxiliary electrode 13, both dipped in conductive fluid 2. The relationship between conductive electrode 1, auxiliary electrode 13 and conductive fluid 2 are clearly shown in FIG. 2A. First, a voltage is applied to conductive electrode 1 to cause an electrolysis reaction. Specifically, cathode half-reaction and anode half-reaction occur at conductive electrode 1 and auxiliary electrode 13, respectively:

cathode half reaction: $2H_2O+2e^- \rightarrow 2(OH)^- + H_2$ anode half reaction: $4(OH)^- \rightarrow 2H_2O + O_2 + 4e^-$ Next, electrolysis introduces bubbles 4, as shown in FIG. 2B, which then forms bubble layers 5, as shown in FIG. 2C. Being a non-conductive region, bubble layers 5 are formed in conductive fluid 2 in the area between conductive electrode 1 and non-conductive work piece 3. Continuous application of high voltage causes ionic breakdown in bubble molecules and capacitive collapse in bubble layers, generating arc discharge between high voltage source and low voltage source. With continuous application of high voltage on its top part, arc 6 as shown in FIG. 2D is developed as a direct result of ionic breakdown and breakthrough in otherwise insulating bubble layer via application of supersaturated voltage. Moreover, heat generated by discharge in the vicinity of lower part of arc 6 causes local temperature to rise rapidly so as to facilitate fusion evaporation 7 on non-conductive work piece 3. As a chemical reaction in local area adjacent to non-conductive work piece 3, etching is accomplished simultaneously as fusion evaporation 7 is being applied in said small area by locally concentrated high temperature, thus achieving local area processing for smoothly finished surface. As shown in FIG. 1, conventional laser processing generates higher temperature as well as heat accumulation in the processing area and leaves drilled hole with course finish. The present invention, on the other hand, discloses a novel way of arc processing by simultaneous application of etching and lower temperature than that in laser processing, in confined local area so as to attain fine processing without leaving the finished product with dross, etc. as does in conventional laser processing.

Figure 3:
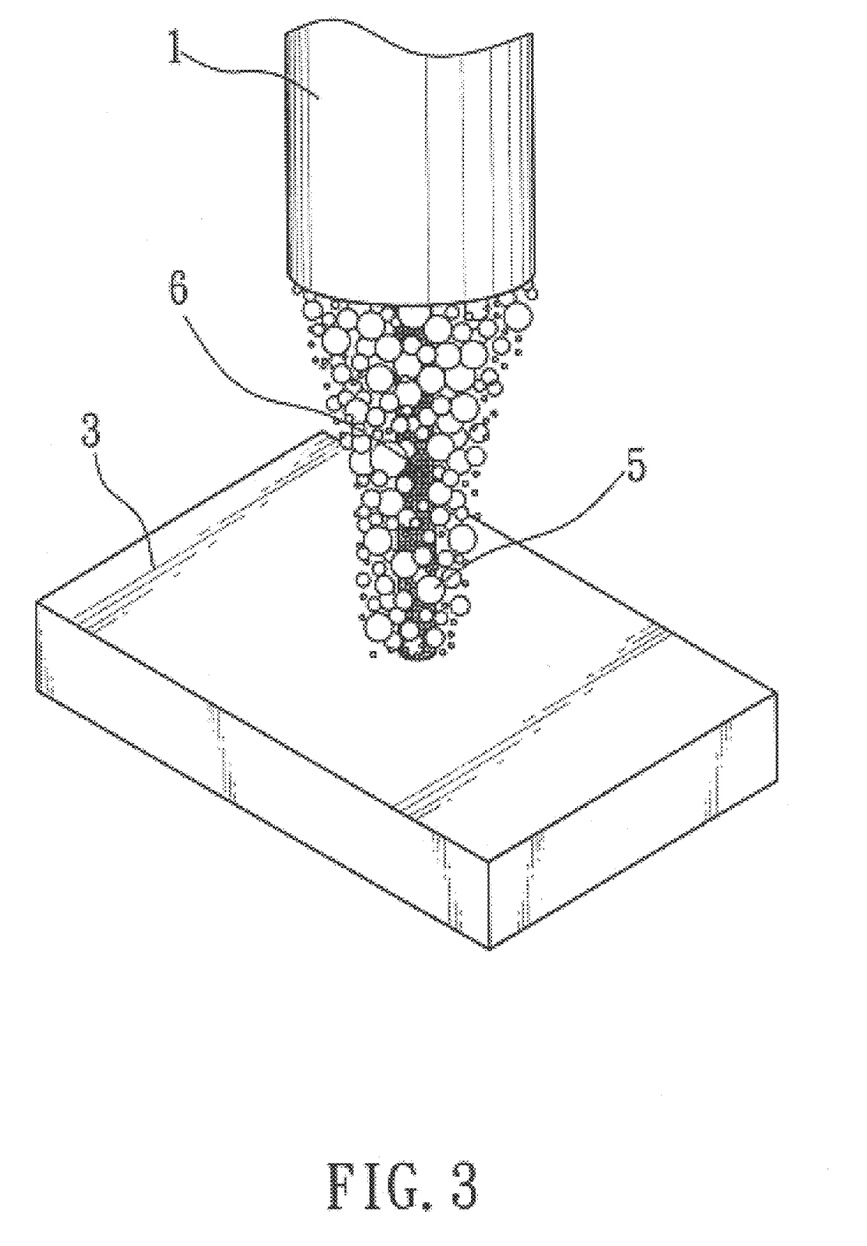
FIG. 3 is a 3-dimensional view of simultaneous arc processing and chemical etching.
Figure 4:
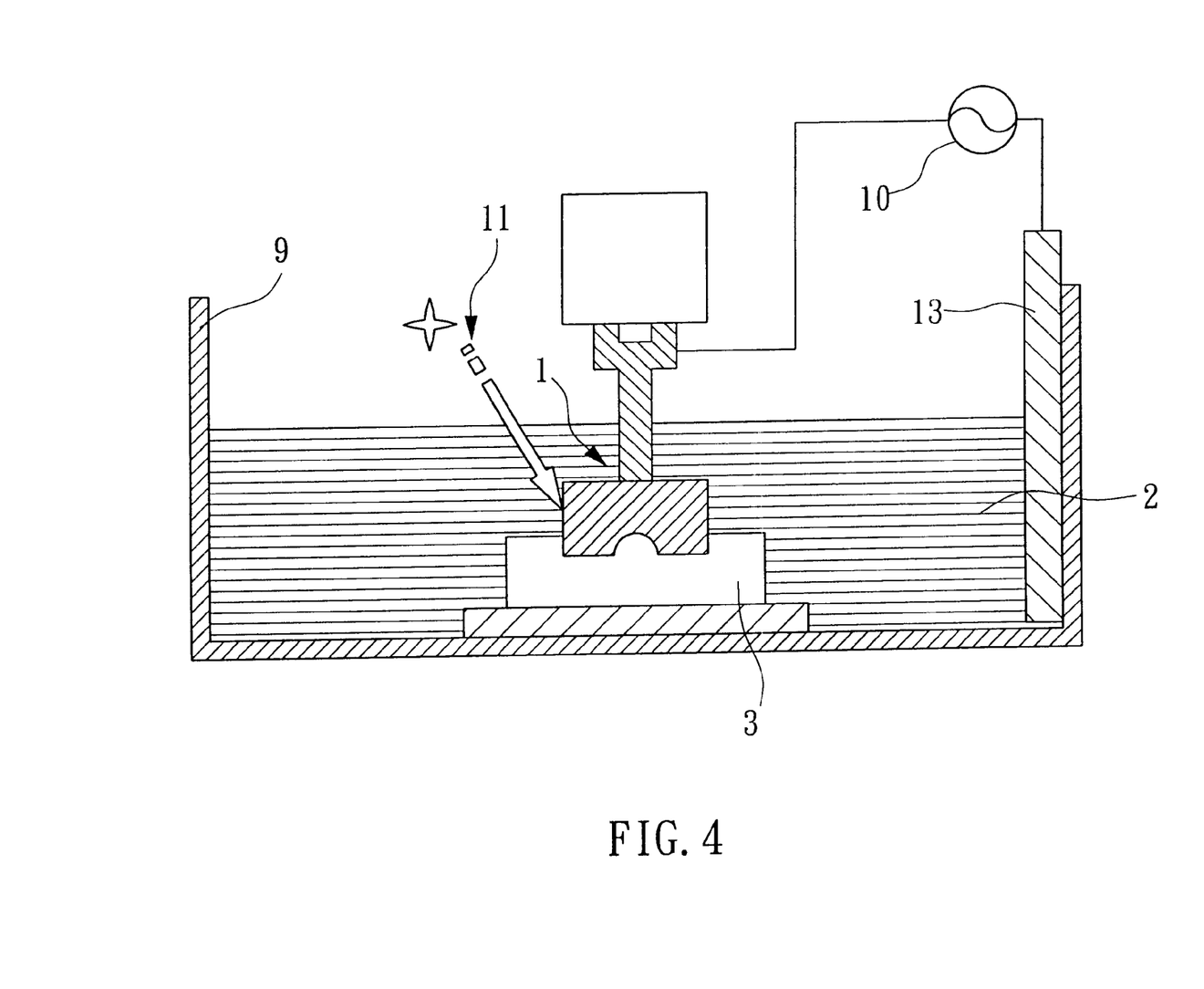
FIG. 4 is a perspective view of simultaneous arc processing and chemical etching for improved processing efficiency.

The 3-dimensional view for simultaneous arc processing and chemical etching as shown in FIG. 3 reveals the relationship among conductive electrode 1, bubble layers 5, arc 6 and non-conductive work piece 3. Conductive electrode 1 can be customized and catered to many sorts of arc processing. Ultra-fine conductive electrodes are often used to carry out wire cut processing of non-conductive or poor-conductivity materials. Various electrodes can also be applied to carve processing non-conductive or poor-conductivity materials to achieve desired shape and form. FIG. 4 shows an example of carve processing where concave conductive electrode is used to obtain similarly shaped work piece. By employing pointed or cylindrical conductive electrode of 200 $\mu$m in diameter, gemstones such as agate, Burmese jade, ruby, and artificial diamonds, etc. are suitable candidates for fine drill processing shown in FIG. 2.

Figure 5:
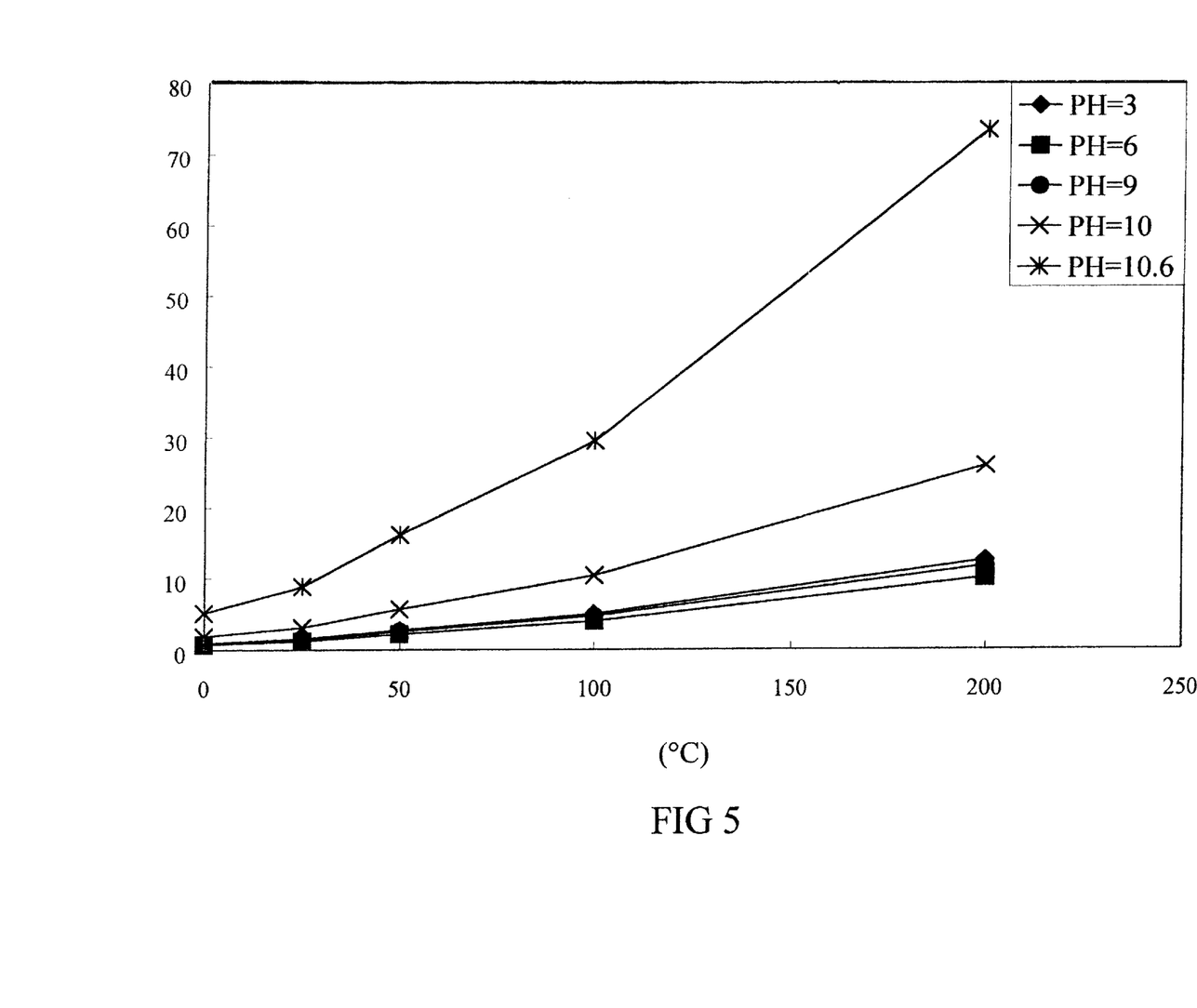
FIG. 5 is the experimental results of simultaneous arc processing and chemical etching, illustrating the relationship between etching rate, temperature and pH value.

Simultaneous arc processing and chemical etching for improved processing efficiency as shown in FIG. 4 may utilize external heater as laser heating device 11 for heating conductive electrode 1 to a temperature range below the melting point. The quickly heated conductive electrode 1 causes the conductive fluid 2 to evaporate with increased speed, thus forming bubbles 4 rapidly. Arc discharge will not occur before accumulated bubbles 4 forms insulating layers. By speeding up the formation of insulating layers and earlier generation of arc discharge, external heater provides cost savings of processing by lowering the electrical power required to induce arc discharge. As indicated in FIG. 5, etching rate is dependent upon the pH value of the conductive fluid and etching rate rises drastically as temperature increases. Hence, conductive electrode equipped with external heating means enhances the rate of processing in the present invention.

Figure 6:
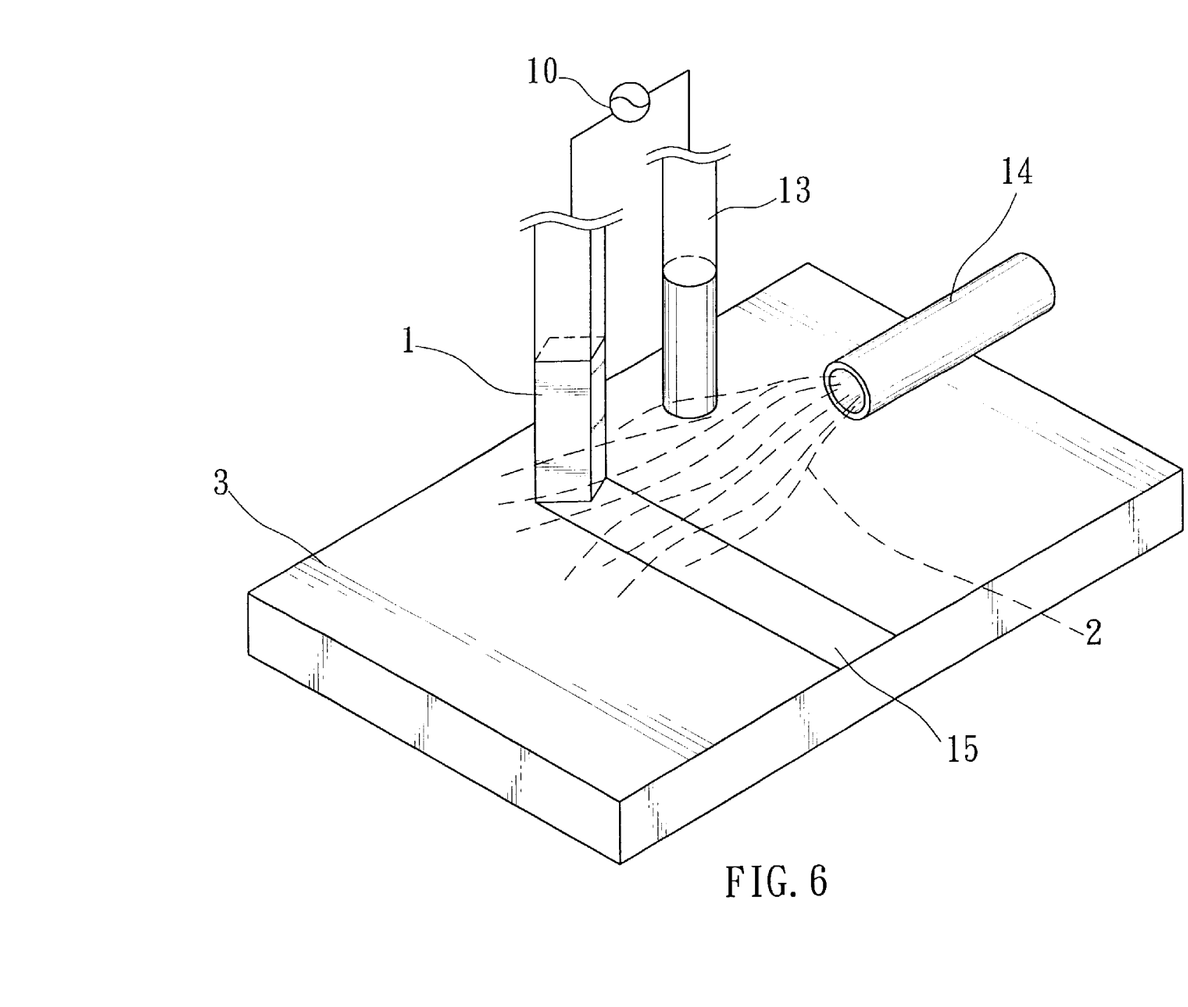
FIG. 6 is a schematic diagram of the device for simultaneous arc processing and chemical etching in accordance with the second embodiment of the present invention.
Figure 7:
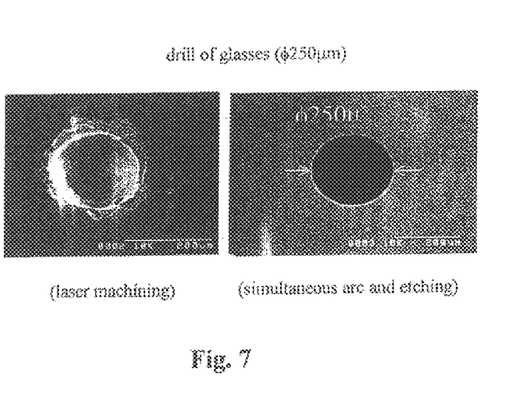
FIG. 7 shows a laser processed work piece and a simultaneous arc and etching processed work piece, side by side.
Figure 8:
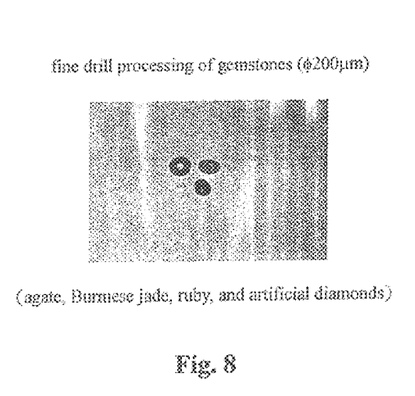
FIG. 8 is a picture of the processed gemstones.

FIG. 6 is a schematic illustration of the device for simultaneous arc processing and chemical etching in accordance with the second embodiment of the present invention. Under the circumstance when conductive electrode 1, auxiliary electrode 13, and non-conductive work piece 3 cannot all fit in the same container, a conductive fluid dispenser 14 is introduced to supply an adequate amount of conductive fluid and to provide the right environment for allowing conductive electrode 1, auxiliary electrode 13, and non-conductive work piece 3 function together for processing along process track 15, when connected to an external power supply 10.

Through simultaneous application of arc processing and chemical etching, the present invention reveals a new way of greatly enhancing processing rate and processing precision. Further, by providing external heating means to heat conductive electrode, the present invention offers added benefit of saving processing cost by reducing the time required for arc to take place. Moreover, conductive fluid with adequate pH value can be selected to attain optimum processing condition. To recap, the device and method disclosed in the present invention provide novel ways of processing non-conductive and poor-conductivity materials with added advantages of saving power consumption and arc initiation time that are substantially different from the conventional arts in existence. In light of the foregoing, it is believed that the present invention possesses novelty and non-obviousness beyond the scope of conventional arts.

While the invention has been described in terms of several preferred embodiments, various alternatives and modifications can be devised by those skilled in the art without departing from the invention. Accordingly, the present invention is intended to embrace all such alternatives that fall within the scope of the claims.

What is claimed is:

1. An arc-processing device capable of simultaneous chemical etching, comprising:

a conductive electrode being a negative electrode;

an auxiliary electrode being a positive electrode;

a power supply connected in series with said conductive electrode and said auxiliary electrode;

a non-conductive work piece for processing, situated in a position on an arc path facing and spaced from the conductive electrode, wherein, under normal temperature and atmosphere, said work piece is nearly non-conductive;

a conductive fluid providing a common environment for said conductive electrode, said auxiliary electrode and said non-conductive work piece; and an external heat source so as to cause the conductive electrode temperature to rise rapidly.

2. An arc processing method capable of simultaneous chemical etching, comprising the steps of:

(a) placing a conductive electrode and a non-conductive work piece in a conductive fluid wherein said non-conductive work piece is situated on an arc path facing and spaced from said conductive electrode;

(b) placing an auxiliary electrode, along with said conductive electrode and said non-conductive work piece, in said conductive fluid wherein an external power supply is connected in series with said conductive electrode and said auxiliary electrode;

(c) heating the conductive electrode by an external heat source;

(d) generating an electrolysis reaction in said conductive fluid;

(e) generating a non-conductive region in said conductive fluid;

(f) generating an arc discharge in said conductive fluid; and (g) effecting fusion evaporation and etching on said non-conductive work piece.

3. The method of claim 2, wherein the electrolysis reaction of step(d) further comprises a cathode half-reaction and an anode half-reaction:

cathode half-reaction: $2H_2O + 2e^- \rightarrow 2(OH)^- + H_2$ anode half-reaction: $4(OH)^- \rightarrow 2H_2O - O_2 + 4e^-$.

4. The method of claim 2, wherein the non-conductive region of step (e) is formed of bubbles generated by electrolysis in said conductive fluid, in a region between said conductive electrode and said non-conductive work piece.

5. The method of claim 2, wherein are discharge of step (f) is generated as a result of a capacitive collapse in the bubble layers and ionic breakdown in air molecules caused by application of high voltage across said conductive electrode and said auxiliary electrode.

6. The method of claim 2, wherein fusion evaporation of step (g) is caused by high temperature concentration in a designated local area being brought about by heat generation associated with the arc discharge.

7. The method of claim 2, wherein etching on said non-conductive work piece of step (g) is brought about by a chemical reaction between said conductive fluid and said non-conductive work piece.

* * * * *